Figure 1:
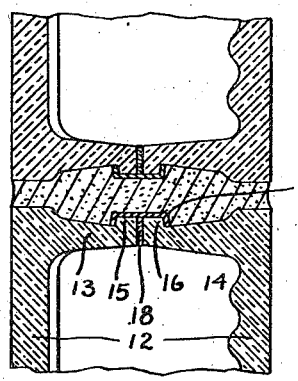

INVENTOR.
EDWARD J. WINSHIP
BY Dorsey Cole & Garner
ATTORNEYS.

Patented Mar. 26, 1940

2,194,731

UNITED STATES PATENT OFFICE 2,194,731

HOLLOW BUILDING UNIT

Edward J. Winship, Baltimore, Md., assignor to Corning Glass Works, Corning, N. Y., a corporation of New York Application September 10, 1937, Serial No. 163,321

6 Claims. (Cl. 72—41)

This invention relates to hollow building blocks, particularly those blocks which are completely enclosed about their peripheries so as to form a hollow body.

It has long been appreciated that the inclusion of a large number of voids of relatively small volume within a wall construction reduces the thermal conductivity of the wall. This has been accomplished in various ways, such as building voids into walls constructed of ordinary materials and the development of structural units which include voids therein. Among the latter there have recently been developed a variety of building units formed from glass, it being desired to utilize the light transmitting qualities of glass yet retain the thermal efficiency and relatively low cost of construction of a hollow masonry wall.

While a considerable number of hollow glass building units have been manufactured and placed in use, it has been found that they are not altogether satisfactory in their present form. As now constructed most of these units include fairly thick face panels spaced apart and integrally connected by somewhat thinner webs about thin peripheries. When built into a wall the relatively low thermal conductivity of the hollow block causes a very considerable temperature differential to exist between the two faces, particularly when directly exposed to summer sunshine. This temperature differential has proved sufficient in many instances to cause fracture of the unit due to the unequal expansion of the inner and outer faces. While attempts have been made to overcome this difficulty by the use of low expansion glasses, such materials are relatively expensive and do not offer a satisfactory solution to the problem. Although special mention has been made of this problem with respect to glass units, it exists to a greater or less extent in all ceramic structures.

The object of my invention is to so construct a hollow building unit that the stresses caused by excessive temperature differentials across the unit may be absorbed therein without damage to said unit.

The principal feature of my invention resides in forming a building unit from a number of independent ceramic sections united by connecting elements composed of materials having a greater degree of elasticity than the ceramic portions of the unit.

A further feature of my invention consists in locating the heavier, weight-bearing ceramic members at a point within the unit where it is protected from excessive temperature changes.

A still further feature of my invention consists in so forming my construction unit that the major ceramic faces thereof are free to expand or contract wholly independently of each other.

Further features of my invention will be apparent from a study of the accompanying specification and appended claims.

The accompanying drawing shows in section a number of different building units incorporating the various features of my invention, and the included joint when these units are assembled to form a wall.

Fig. 1 discloses the simplest type of construction embodying my invention. This structure includes a pair of complementary ceramic sections having relatively thick faces 12 to constitute the load-bearing portions of the unit, and integral flange members 13 and 14 about their peripheries which form the walls of the unit. Whereas in prior art structures these flanges have been integrally united by fusion or in some similar manner, I prefer to place a fabric cushion 18 between the edges of the flanges and clamp them together as by the metallic strip 17 spun down over the shoulders 15, 16 adjacent the edges of the flanges.

Figure 2:
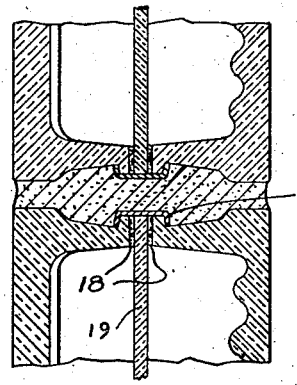

Fig. 2 discloses a slight modification of the structure of Fig. 1, a ceramic sheet 19 being placed between the flanges before they are clamped together so as to create a plurality of dead air spaces within the unit.

Figure 3:
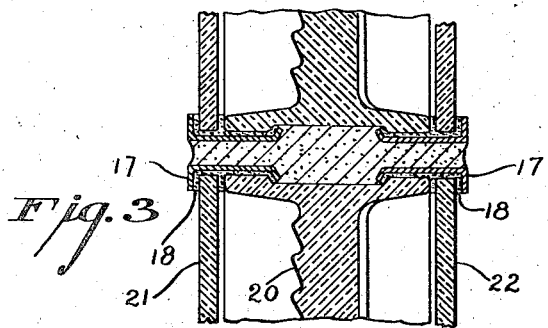

Fig. 3 discloses a somewhat different type of building unit in which a heavy central ceramic member 20 having flanges extending in both directions from its periphery forms the load-carrying portion of the unit. Face plates 21, 22 of relatively thin section are clamped to the edges of the flanges of this central member to form the dead air pockets and provide a smooth external surface for the unit.

In each of these three structures a strip of fabric 18 impregnated with rubber, resin or any other tacky, non-volatile material is utilized wherever two ceramic parts are to be clamped together to form a resilient cushion between the parts and to seal the cavities therein against the entrance of moisture. While a heavy grade of paper may be utilized in this manner, I prefer to use thin cotton or linen cloth. Although it is possible to preform the metallic clamping strip 17 to the desired shape, I prefer to solder a flat strip in position around a unit and then spin down the edges of the strip over the projecting shoulders of the ceramic parts thereby effecting a tight seal despite surface irregularities on the ceramic part. In those cases where glass is used as the ceramic material, diffusing and refracting surfaces may be easily provided in the heavy, weight-bearing portions of the unit while, if desired, the thin sheets 19, 21 and 22 may be made of colored or opal glass according to the effect desired in a given location.

The above procedure permits the manufacture of a large variety of colored building units with relatively little expense. In all instances the heavy pressed parts of the unit may be made of clear glass and the desired color obtained merely by the introduction of a thin sheet of glass of the desired color. Furthermore, a colored sheet of glass placed on the opposite side of a heavy ribbed member, such as 12 or 20, from the light source is substantially invisible. Thus it is possible with building units of this nature to introduce color transmitting units in a large wall area without materially affecting the appearance of the wall from the exterior or light source side.

Figure 4:
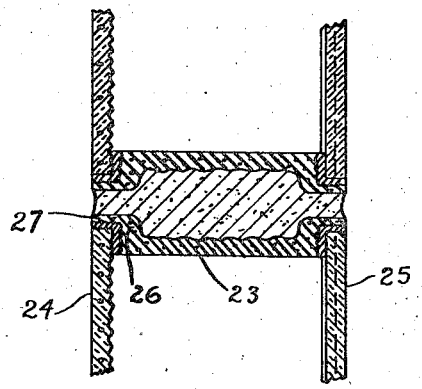
Figure 5:
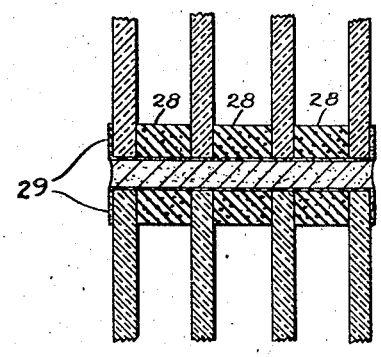

For those cases where a building unit of low strength will suffice, I have provided a structure in which only the face plates of the unit are of ceramic material. Two embodiments of this invention are shown in Figs. 4 and 5. In Fig. 4, I make use of a tubular piece of rubber fabric 23 of sufficient diameter to permit its distortion into position, as shown, embracing the edges of the face plates 24 and 25. This rubber fabric may be formed with either a woven or cord fabric foundation and is preferably molded along its edges to provide a shoulder 26 which may be cemented to the inner face of the ceramic plate as well as a flange 27 embracing its edge. In place of the rubber impregnated fabric 23, molded resinous materials may be substituted.

In Fig. 5, I have shown a built-up unit of ceramic sheets and spacing members. The spacing members 28 are formed from rubber impregnated fabric cut to the dimensions of the unit and cemented along the edges of the ceramic sheets. Additional strength may be imparted to the complete unit by properly arranging the joints in the spaces to avoid identical joints in adjacent layers at any given corner. After the sheets have been cemented to the spacers the entire unit may be sealed against the ingress of moisture with a layer of adhesive tape 29. This same result may be accomplished by dipping the edge of the assembled unit in latex or an artificial resin which may subsequently be solidified in position on the unit.

In both structures, shown in Figs. 4 and 5, the inner surface of the rubber spacers may be colored as desired or given a white reflecting coating which will aid in the transmission of light through the unit when the ceramic parts thereof are made of glass. When glass plates are used they may advantageously incorporate diffusing or refracting surfaces and in some instances wire reenforcement.

While I have referred to the use of glass as a most desirable ceramic material for my building units, the use of ordinary burnt clay forms will produce a building unit which is less expensive and yet will retain many of the beneficial features of my invention.

While I have shown a number of preferred units incorporating my novel construction, it is to be understood that modification thereof is to be permitted without departing from the scope of my invention as defined by the appended claims.

I claim:

1. A sealed hollow building unit comprising two independent ceramic face plates, said face plates having integral flanges about their peripheries, and non-ceramic clamping means engaging the edges of these flanges and fastening said face plates together to form a sealed hollow block.

2. A building unit comprising two independent ceramic face plates having integral flanges about the edges thereof, integral shoulders adjacent the edges of these flanges, and metallic clamping means extending around the periphery of the unit and engaging said shoulders to clamp said flanges together, thereby forming a hollow block.

3. A building unit comprising complementary ceramic parts adapted to form a hollow block, plastic sealing material positioned between the edges of said portions to prevent the ingress of moisture therebetween and metallic clamping means engaging the edges of said ceramic portions and clamping them together against said sealing material.

4. A building unit comprising complementary ceramic parts, an intermediate ceramic member cooperating with said parts to form a hollow block having plurality of cavities therein and clamping means engaging the edges of each of said ceramic elements to bind the same into a rigid unit.

5. A building unit comprising complementary glass parts adapted to form a hollow block, an intermediate glass member cooperating with said parts to form a plurality of cavities in said block and clamping means engaging the edges of said glass parts, one of said glass parts having a different color from the remainder of said glass parts.

6. A building unit comprising a central weight bearing ceramic member having integral flanges adjacent the edges of both faces thereof, ceramic face plates cooperating with said flanges to form dead air spaces within the unit, and non-ceramic binding strips engaging the edges of said flanges and face plates to hold the same together.

EDWARD J. WINSHIP.